(12) United States Patent
Lee et al.

(10) Patent No.: US 12,322,806 B2
(45) Date of Patent: Jun. 3, 2025

(54) ELECTRODE FOR A SECONDARY BATTERY WITH IMPROVED RAPID CHARGING PERFORMANCE, METHOD OF MANUFACTURING THE SAME, AND SECONDARY BATTERY INCLUDING THE SAME

(71) Applicant: SK ON CO., LTD., Seoul (KR)

(72) Inventors: Dong Hoon Lee, Daejeon (KR); Min Hwan Kim, Daejeon (KR); Young Jun Kim, Daejeon (KR); Hyo Sung Lim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/512,836

(22) Filed: Nov. 17, 2023

(65) Prior Publication Data
US 2024/0170673 A1     May 23, 2024

(30) Foreign Application Priority Data
Nov. 17, 2022   (KR) .................. 10-2022-0154367

(51) Int. Cl.
*H01M 4/62* (2006.01)
*H01M 4/04* (2006.01)
(Continued)

(52) U.S. Cl.
CPC ......... *H01M 4/622* (2013.01); *H01M 4/0404* (2013.01); *H01M 4/625* (2013.01); *H01M 2004/021* (2013.01); *H01M 10/052* (2013.01)

(58) Field of Classification Search
None
See application file for complete search history.

(56) References Cited

U.S. PATENT DOCUMENTS

2010/0330432 A1\*  12/2010  Traulsen ............... B02C 19/00
                                                        252/182.1
2011/0027649 A1    2/2011  Abe
(Continued)

FOREIGN PATENT DOCUMENTS

CN    113839003 A    12/2021
EP    3660958 A1    6/2020
(Continued)

OTHER PUBLICATIONS

Extended European Search Report for the European Patent Application No. 23210462.0 issued by the European Patent Office on Apr. 8, 2024.

(Continued)

*Primary Examiner* — Tracy M Dove
(74) *Attorney, Agent, or Firm* — IP & T GROUP LLP

(57) ABSTRACT

The present disclosure relates to an electrode for a secondary battery with improved rapid charging performance, a method of manufacturing the same, and a secondary battery including the same, and provides an electrode for a secondary battery including a current collector, an electrode active material layer located on at least one surface of the current collector, and a binder layer located on at least one surface of the current collector and protruding from at least one end of the electrode active material layer, in which the binder layer satisfies the following Expression 1. [Expression 1] CA/B≤ 0.6 (In Expression 1, CA is wt % of a conductive material in the binder layer, and B is wt % of a binder in the binder layer, based on a total weight of the binder layer).

18 Claims, 3 Drawing Sheets
(2 of 3 Drawing Sheet(s) Filed in Color)

(51) Int. Cl.
  *H01M 4/36* (2006.01)
  *H01M 4/02* (2006.01)
  *H01M 10/052* (2010.01)

(56) References Cited

U.S. PATENT DOCUMENTS

| | | | |
|---|---|---|---|
| 2018/0076451 A1 | 3/2018 | Kim et al. | |
| 2018/0151884 A1* | 5/2018 | Yushin | H01M 4/134 |
| 2018/0175366 A1* | 6/2018 | Zheng | H01M 4/1391 |
| 2019/0013513 A1* | 1/2019 | Liu | H01M 4/382 |
| 2020/0083542 A1* | 3/2020 | Yushin | H01M 4/8828 |
| 2022/0102727 A1* | 3/2022 | Lee | H01M 4/13 |
| 2023/0006206 A1* | 1/2023 | Jeon | H01M 4/133 |

FOREIGN PATENT DOCUMENTS

| | | |
|---|---|---|
| KR | 20150096188 A | 8/2015 |
| KR | 101811833 B1 | 1/2018 |
| KR | 101840494 B1 | 3/2018 |
| KR | 10-2019-0060439 A | 6/2019 |
| KR | 10-2022-0042995 A | 4/2022 |

OTHER PUBLICATIONS

Office Action for Korean Patent Application No. 10-2022-0154367 issued by the Korean Patent Office on Mar. 9, 2025.

\* cited by examiner

ELECTRODE FOR A SECONDARY BATTERY WITH IMPROVED RAPID CHARGING PERFORMANCE, METHOD OF MANUFACTURING THE SAME, AND SECONDARY BATTERY INCLUDING THE SAME

CROSS-REFERENCE TO RELATED APPLICATIONS

This application claims priority under 35 U.S.C. § 119 to Korean Patent Application No. 10-2022-0154367, filed on Nov. 17, 2022, in the Korean Intellectual Property Office, the disclosure of which is incorporated herein by reference in its entirety.

TECHNICAL FIELD

The following disclosure relates to an electrode for a secondary battery with improved rapid charging performance, a method of manufacturing the same, and a secondary battery including the same.

BACKGROUND

Recently, as regulations related to automobile fuel efficiency and exhaust gases are being strengthened around the world, growth of an electric vehicle (EV) market equipped with secondary batteries is accelerating. However, electric vehicles require a charging time of about 6 to 7 hours based on a 7 kW level slow charging method, and thus, compared to the conventional internal combustion engine that can secure a power source required for driving by fuel up within five minutes, there is a problem that charging time takes a very long time.

In order to improve the resistance and rapid charging performance of the above-described batteries, a technology was proposed to develop a binder with high adhesive strength and use the binder to reduce the binder content. However, there is a limit to lowering the binder content, which has high adhesive strength, and when the binder content is lowered, a serious problem occurs in which an electrode active material layer is detached from a current collector during a notching process or charging and discharging processes of the battery.

To solve the above problem, technology is being developed to efficiently distribute binder inside the electrode. For example, a technology has been developed to apply an electrode active material layer on a current collector in a dual layer by applying electrode slurry with a high binder content to a lower layer and electrode slurry with a low binder content to an upper layer. However, there are limitations in realizing ideal binder distribution due to the phenomenon of binder particles moving to the surface of the electrode active material layer during the drying process.

Another method is proposed to form a thin primer layer containing a large amount of binder on the current collector and then form an electrode active material layer on the primer layer. In order to maintain electrical contact between the current collector and the electrode active material layer, the primer layer uses various conductive materials such as carbon black or CNT along with a binder. However, in this method, the adhesive strength between the current collector and the electrode active material layer is poor due to the portion occupied by the conductive material with a large specific surface area, and the binder is aggregated in the conductive material to increase electrode density, increasing battery resistance and reducing rapid charging performance.

SUMMARY

An embodiment of the present invention is directed to providing an electrode and a battery capable of improving interfacial adhesive strength between a current collector and an electrode active material layer by efficiently distributing a binder inside an electrode, preventing process defects and appearance defects such as detachment of an active material from the electrode, and improving rapid charging performance.

In addition, an embodiment of the present invention is directed to providing a new electrode manufacturing method and a binder suspension composition suitable for this manufacturing method capable of improving battery resistance while maintaining interfacial adhesive strength between a current collector and an electrode active material layer.

The electrode in the present disclosure can be widely applied in the field of green technology, such as electric vehicles, battery charging stations, and solar power generation and wind power generation using other batteries. In addition, the electrode of the present disclosure can be used in eco-friendly electric vehicles, hybrid vehicles, or the like to prevent climate change by suppressing air pollution and greenhouse gas emissions.

In one general aspect, an electrode for a secondary battery includes: a current collector; an electrode active material layer located on at least one surface of the current collector; and a binder layer located on at least one surface of the current collector and protruding from at least one end of the electrode active material layer, in which the binder layer satisfies the following Expression 1.

$$CA/B \leq 0.6 \qquad \text{[Expression 1]}$$

In Expression 1, CA is wt % of a conductive material in the binder layer, and B is wt % of a binder in the binder layer, based on a total weight of the binder layer.

The electrode for a secondary battery may satisfy the following Expression 2.

$$0.3 < B*t*Bd/Lw < 1.5 \qquad \text{[Expression 2]}$$

In Expression 2, B is wt % of a binder in the binder layer, t is a thickness of the binder layer (μm), Bd is a density of the binder in the binder layer (g/cm$^3$), and Lw is a cross-sectional application amount of the electrode active material layer (mg/cm$^2$), based on a total weight of the binder layer.

A thickness of the binder layer may be 3 μm or less.

A ratio of a thickness of the binder layer to a thickness of the electrode active material layer may be 0.1 or less.

The electrode active material layer may include an SBR-based binder.

The electrode active material layer may include 3 wt % or less of binder based on the total weight.

The electrode active material layer may further include a conductive material of 5 wt % or less based on the total weight.

Porosity of the electrodes may be 12% or more.

A mean pore size of the electrode may be 0.75 μm or more.

In another aspect, a method of manufacturing an electrode for a secondary battery includes: a) applying a binder suspension to at least one surface of a current collector; b) applying electrode slurry to an upper portion of the binder suspension; and c) simultaneously drying the binder suspension applied in the a) and the electrode slurry applied in the b), in which the binder suspension in the a) satisfies the following Expression 3.

$$CA'/B' \leq 0.6 \qquad \text{[Expression 3]}$$

In Expression 3, CA' is wt % of a conductive material in the binder suspension, and B' is wt % of a binder in the binder suspension, based on a total weight of the binder suspension.

A width of the binder suspension applied in the a) may be greater than a width of the electrode slurry applied in the b) based on a width direction of the electrode.

The binder suspension in the a) may include 5 to 40 wt % of the binder based on a total weight of the binder suspension.

The binder suspension in the a) may further include 5 wt % or less of a conductive material based on the total weight of the binder suspension.

The binder suspension in the a) may include 50 wt % or more of the binder based on a total solid weight of the binder suspension.

The binder suspension in the a) may include an SBR-based binder.

A thickness of the binder suspension applied in the a) may be 10 μm or less.

In the a), the binder suspension may be uniformly applied to one surface of the current collector.

The electrode slurry in the b) may include 2 wt % or less of the binder based on a total solid weight of the electrode slurry.

The c) may be performed at a temperature of 50 to 300·C for 10 to 300 seconds.

In still another aspect, a secondary battery includes: the electrode as above-described; a separation membrane; and an electrolyte.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

DETAILED DESCRIPTION OF MAIN ELEMENTS

Figure 1:
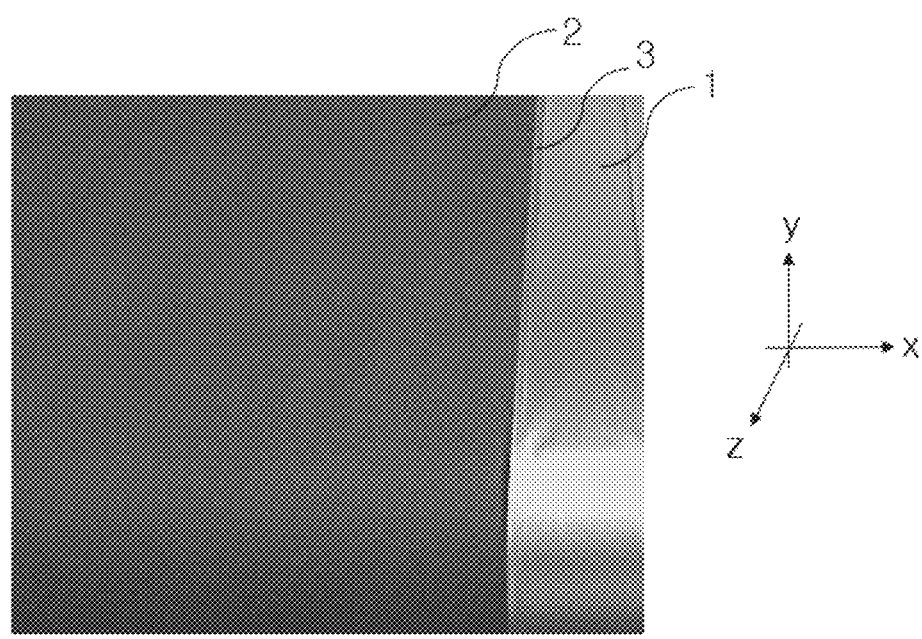
FIG. 1 is a photograph of a negative electrode of Example 1 taken in a z-axis direction.

1: Current collector
2: Electrode active material layer
3: Binder layer

DETAILED DESCRIPTION OF EMBODIMENTS

Hereinafter, the present disclosure will be explained in detail. However, this is illustrative only and the present disclosure is not limited to the specific embodiments described by way of example.

The advantages and features of the present disclosure, and how to achieve them, will become clear by referring to the embodiments described in detail below along with the accompanying drawings. However, the present disclosure is not limited to the embodiments disclosed below and will be implemented in various different forms. These embodiments are provided solely to ensure that the present disclosure is complete and to fully inform those skilled in the art of the present disclosure of the scope of the disclosure, and the present disclosure is defined by the scope of the claims. Referring to the drawing attached below, the specific details for implementing the present disclosure are explained in detail. Regardless of the drawings, the same reference numerals refer to the same elements, and "and/or" includes each and all combinations of one or more of the mentioned items.

Unless otherwise defined, all terms (including technical and scientific terms) used in the present disclosure may be used in a meaning that can be commonly understood by those skilled in the art in the technical field to which the present disclosure belongs. When a part in the entire specification is said to "include" a certain element, this means that it may further include other elements rather than excluding other elements, unless specifically stated to the contrary. The singular also includes the plural, unless specifically stated in the phrase.

In the present disclosure, when a part of a layer, membrane, area, plate, or the like is said to be "above" or "on" another part, this includes cases where it is "right on top" of another part, as well as cases where there is another part in between.

In the present disclosure, a "width direction" refers to the direction perpendicular to a traveling direction of the electrode when manufacturing the electrode, and refers to the direction toward the current collector side where electrode slurry is not applied based on the center of the electrode active material layer to which electrode slurry is applied.

In the present disclosure, a "wet-on-wet" method may refer to a method of applying a liquid suspension, then applying a liquid slurry without a separate drying process, and then drying the applied liquid suspension and liquid slurry at the same time.

The present disclosure may provide an electrode for a secondary battery including a current collector, an electrode active material layer located on at least one surface of the current collector, and a binder layer located on at least one surface of the current collector and protruding from at least one end of the electrode active material layer, in which the binder layer satisfies the following Expression 1.

$$CA/B \leq 0.6 \qquad \text{[Expression 1]}$$

In Expression 1, CA is wt % of a conductive material in the binder layer, and B is wt % of a binder in the binder layer, based on a total weight of the binder layer.

The binder layer in the present disclosure may refer to an area that protrudes from a portion where the current collector and the electrode active material layer are in contact. In one embodiment, the binder layer may be an area derived from an area where a binder suspension with a relatively high binder content is applied during manufacturing the electrode, but the present disclosure is not limited thereto. In the above embodiment, the binder layer may have a similar composition to the area of the electrode active material layer adjacent to the current collector, and when the composition of the binder layer satisfies Expression 1, the area of the electrode active material layer adjacent to the current collector may also satisfy Expression 1 above, but the present disclosure is not limited thereto.

According to the above embodiment, when Expression 1 is satisfied, the interfacial adhesive strength between the current collector and the electrode active material layer can be improved even if no conductive material is included or a trace amount of conductive material is included compared to the binder. Specifically, when Expression 1 is satisfied, it is possible to prevent the adsorption of the binder to a conductive material with a large specific surface area, which reduces the effect of improving the interfacial adhesive strength of the binder densely distributed at the interface between the current collector and the electrode active material layer, or prevent the battery resistance from increasing due to increased electrode density. In addition, when Expression 1 is satisfied, the ratio of the content of the conductive material compared to the content of the binder in the area of the electrode active material layer adjacent to the current collector is controlled to a certain value or less, and thus, it is possible to improve the interfacial adhesive strength between the current collector and electrode active material layer while improving battery resistance.

In a specific embodiment to further improve the interfacial adhesive strength between the current collector and the electrode active material layer, the CA/B value of Expression 1 may be 0.5 or less, 0.4 or less, or 0.3 or less, more specifically 0.2 or less or 0.1 or less, still more specifically 0.05 or less, and most specifically 0.03 or less, but is not limited thereto.

When the electrode of the above embodiment satisfies Expression 1, the content of conductive material is low compared to the content of binder in the area of the electrode active material layer of the portion adjacent to the current collector, thereby suppressing the phenomenon of binder being adsorbed to the conductive material and increasing electrode density. Therefore, pore characteristics can be excellent.

The electrode of one embodiment has a porosity of 12% or more measured by ASTM D4284-07, and has excellent electrolyte impregnation, thereby improving battery resistance. In a specific embodiment to further improve battery resistance, the porosity of the electrode may optionally be 13% or more, 14% or more, 15% or more, or 16% or more, but is not limited thereto. The larger the porosity of the electrode, the better the impregnation of the electrolyte. However, if the porosity is too large, there is a risk that the mechanical properties of the electrode may deteriorate. Therefore, the porosity of the electrode may be 25% or less or 20% or less, but is not limited thereto.

The electrode of one embodiment may optionally have a mean pore size of 0.75 μm or more as measured by ASTM D4284-07. When the electrode has the mean pore size, the electrolyte impregnation is excellent and battery resistance can be further improved, but the present disclosure is not limited thereto. In a specific embodiment to further improve electrolyte impregnation, the mean pore size of the electrode as measured by ASTM D4284-07 may be 0.78 μm or more or 0.8 μm or more, but is not limited thereto. The larger the mean pore size of the electrode, the better the impregnation of electrolyte, but if the mean pore size is too large, there is a risk that the mechanical properties of the electrode may deteriorate. Therefore, the mean pore size of the electrode may be 3 μm or less, 2 μm or less, 1.5 μm or less, or 1 μm or less, but the present disclosure is not limited thereto.

In a specific embodiment to further increase the interfacial adhesive strength between the current collector and the electrode active material layer, an electrode for secondary battery that further satisfies the following Expression 2 may be optionally provided.

$$0.3 < B*t*Bd/Lw < 1.5 \qquad [\text{Expression 2}]$$

In Expression 2, B is wt % of a binder in the binder layer, t is a thickness (μm) of the binder layer, Bd is a density (g/cm$^3$) of the binder in the binder layer, and Lw is a cross-sectional application amount (mg/cm$^2$) of the electrode active material layer, based on a total weight of the binder layer.

In the above embodiment, the electrode has a binder distribution that satisfies Expression 2, and the adhesive strength can be further increased by increasing the binder content in the area adjacent to the interface between the current collector and the electrode active material layer. The electrode can further increase the interfacial adhesive strength by having a binder distribution that satisfies Expression 2, but in a specific embodiment to further increase the interfacial adhesive strength, optionally, the lower limit of the "B*t*Bd/Lw" value of Expression 2 may be greater than 0.3, equal to or greater than 0.4, or less than 0.5, and the upper limit thereof may be less than 1.5, equal to or less than 1.2, or equal to or less than 1.0, specifically greater than 0.3 to less than 1.5, more specifically 0.4 to 1.2, and still more specifically 0.5 to 1.0.

In one embodiment, it is advantageous to improve the interfacial adhesive strength when the thickness of the binder layer is equal to or greater than a certain level, but when the thickness is too excessive, there is a risk that the battery resistance characteristics may be deteriorated. The thickness of the binder layer may be 0.1 μm or more, 0.2 μm or more, 0.3 μm or more, 3 μm or less, 2.5 μm or less, 2 μm or less, 1.5 μm or less, or a value between the above values, specifically 0.1 to 3 μm, 0.2 to 2.5 μm, 0.3 to 2 μm, or 0.3 to 1.5 μm, but is not limited thereto.

In a specific embodiment to further improve battery resistance while further improving the interfacial adhesive strength between the current collector and the electrode active material layer, optionally, the ratio of the thickness of the binder layer to the thickness of the electrode active material layer may be more than 0, 0.1 or less, 0.09 or less, 0.07 or less, 0.05 or less, or a value between the above values. Specifically, the ratio may be more than 0 but less than 0.1, more than 0 but less than 0.09, 0.005 to 0.09 or less, more than 0 and less than 0.07, or more than 0 and less than 0.05, but the present disclosure is not limited thereto.

Below, each configuration of the electrode according to the present embodiment will be described, but is not limited thereto as long as the binder distribution and pore characteristics of the electrode described above can be achieved.

In one embodiment, the current collector may be selected from the group consisting of copper foil, nickel foil, stainless steel foil, titanium foil, nickel foam, copper foam, polymer substrate coated with a conductive metal, and combinations thereof, but the present disclosure is not limited thereto.

In one embodiment, the electrode active material layer may include an electrode active material and a binder, and may optionally include a thickener or conductive material.

In one embodiment, the electrode may be a positive electrode or a negative electrode, and the electrode active material may be selected depending on the type of electrode.

When the electrode is a positive electrode, the electrode active material can be used without limitation as long as it is a positive electrode active material commonly used in secondary batteries. Examples of positive electrode active materials may include any one positive active material particle selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM^1{}_yM^2{}_zO_2$ ($M^1$ and $M^2$ are independently selected from the group consisting of Al, Ni, Co, Fe, Mn, V, Cr, Ti, W, Ta, Mg, and Mo, and x, y and z are independently atomic fractions of oxide composition elements, and may include any one positive electrode active material particle selected from the group consisting of $0 \leq x < 0.5$, $0 \leq y < 0.5$, $0 \leq z < 0.5$, and $x+y+z \leq 1$ or may include a mixture of two or more thereof, but is not limited thereto.

When the electrode is a negative electrode, the electrode active material can be used without limitation as long as it is a negative electrode active material commonly used in secondary batteries. An example of the negative electrode active material may be a carbon-based negative electrode active material, a silicon-based negative electrode active material, or a mixture thereof, but is not limited thereto. The carbon-based negative electrode active material may be one or more from artificial graphite, natural graphite, and hard carbon, but is not limited thereto. Silicon-based negative electrode active materials may be Si, SiOx ($0<x \leq 2$), a Si-Q alloy (where Q is an element selected from the group consisting of alkali metals, alkaline earth metals, Group 13 elements, Group 14 elements, Group 15 elements, Group 16 elements, transition metals, rare earth elements, and combinations thereof, but not Si), a Si-carbon composite, or a mixture of at least one of these and SiO2, but is not limited thereto.

In one embodiment, the binder may include a styrene butadiene rubber (SBR)-based binder, and examples of the SBR-based binder may include styrene-butadiene rubber, styrene-butadiene-acrylate copolymer, or the like, but the present disclosure is not limited thereto. When using the SBR-based binder or the like as a binder, the binder is mixed in particle form, so the viscosity of the binder suspension is very low. In addition, the SBR-based binder has good spreadability with the current collector, so it can be applied uniformly in the width direction of the current collector at a relatively thin thickness without forming a separate pattern, thereby uniformly improving the interfacial adhesive strength between the current collector and the electrode active material layer.

In one specific embodiment, optionally, an average diameter of the SBR-based binder particles may be 200 nm or less or 150 nm or less, and in a case where the size of the binder particle is small in the diameter range, when electrode slurry is applied to the upper portion of the binder suspension and dried, the binder particles easily diffuse into the upper electrode active material layer due to osmotic pressure, so even after drying, a clear binder insulating area may not be formed between the binder suspension and the electrode slurry.

Meanwhile, in the case of binders such as polyacrylic acid (PAA), polyvinylidene fluoride (PVdF), and carboxymethyl cellulose (CMC), which can be used as electrode binders in addition to SBR-based binders, unlike the SBR-based binder, the electrode binder may be applied in a state of being dissolved in a solvent, or when the electrode is dried, the phase separates after the solvent is sufficiently dried to form a separate binder area. For this reason, binders such as polyacrylic acid do not easily migrate to the upper electrode active material layer during the drying process, and furthermore, there is a risk of increasing the interfacial resistivity by forming a clear binder area between the current collector and the electrode active material layer. In addition, there is a problem in that the current collector is not uniformly distributed in the width direction and forms a pattern (that is, island type, dot type), and thus, there is a risk that the interfacial adhesive strength between the current collector and the electrode active material layer may decrease. In consideration of this, the binder suspension may include or may not include 5 wt % or less, 4 wt % or less, or 3 wt % or less of at least one of polyacrylic acid (PAA), polyvinylidene fluoride (PVDF), and carboxymethylcellulose (CMC) based on the total weight of the binder in the binder suspension.

In a specific embodiment to improve the interfacial adhesive strength and interfacial resistivity between the current collector and the electrode active material layer, the SBR-based binder may be used alone as the binder, but is not limited thereto.

In one embodiment, the thickener may be a mixture of one or more cellulose-based compounds, specifically carboxymethyl cellulose, hydroxypropyl methyl cellulose, methyl cellulose, or alkali metal salts thereof, but is not limited thereto.

In one embodiment, the conductive material may be selected from the group consisting of natural graphite, artificial graphite, carbon black, acetylene black, Ketjen black, carbon fiber, carbon nanotubes, and combinations thereof, but is not limited thereto.

In one embodiment, the electrode active material layer may include the binder and/or the thickener.

In a specific embodiment, the electrode active material layer may include 3 wt % or less, 2.5 wt % or less, 2 wt % or less, 1 wt % or less of binder, more than 0 wt %, 0.1 wt % or more, 0.2 wt % or more of binder, or a value between the above values based on the total weight. More specifically, the electrode active material layer may include a binder more than 0 wt % but 3 wt % or less, 0.1 to 2.5 wt %, 0.2 to 2 wt %, or 0.2 to 1 wt % of binder.

In a specific embodiment, the electrode active material layer may include or not include the thickener of 2 wt % or less, 1.5 wt % or less, more than 0 wt %, 0.01 wt % or more, 0.5 wt % or more, or a value between the above values, based on the total weight. More specifically, the electrode active material layer may include the thickener of more than 0 wt % but 2 wt % or less, or 0.5 to 1.5 wt %.

The conductive material may not be included, but in a specific embodiment, the electrode active material layer may optionally further include the conductive material of 5 wt % or less based on the total weight. In a more specific embodiment, the electrode active material layer may optionally include the conductive material of 5 wt % or less, 3 wt % or less, more than 0 wt %, 0.1 wt % or more, or a value between the above values, based on the total solid weight, and more specifically, the electrode active material layer may optionally include conductive material of more than 0 wt % but 5 wt % or less, or more than 0 wt % but 3 wt % or less, but is not limited thereto.

Hereinafter, the method of manufacturing the electrode for a secondary battery of the present embodiment will be described. When the terms in the method of manufacturing the electrode for a secondary battery described later are the same as the terms in the electrode for the secondary battery described above, the explanation of the terms in the electrode for the secondary battery described above can be applied in the same way.

In one embodiment, there is provided a method of manufacturing an electrode for a secondary battery, including a) applying a binder suspension to at least one surface of a current collector, b) applying electrode slurry to an upper portion of the binder suspension, and c) simultaneously drying the binder suspension applied in the a) and the electrode slurry applied in the b), in which the binder suspension in the a) satisfies the following Expression 3.

$$CA'/B' \leq 0.6 \qquad \text{[Expression 3]}$$

In Expression 3, CA' is wt % of the conductive material in the binder suspension, and B' is wt % of the binder in the binder suspension, based on a total weight of the binder suspension.

As in the above embodiment, when a wet-on-wet method is adopted in which a liquid binder suspension is applied, then a liquid electrode slurry is applied without a separate drying process, and then the applied liquid binder suspension and liquid electrode slurry are dried simultaneously, during the process of applying and drying the slurry, the binder suspension is sufficiently mixed into the electrode slurry due to migration and diffusion of the binder particles within the binder suspension, so that a clear insulating area is not formed. Therefore, efficient binder distribution can be achieved without increasing battery resistance even when a trace amount of conductive material is included in the binder suspension or not. In addition, by efficiently distributing the binder inside the electrode through the process of the above embodiment, the interfacial adhesive strength between the current collector and the electrode active material layer is improved, and it is possible to prevent external defects in processes such as detachment of the electrode and improve rapid charging performance.

In addition, according to the above embodiment, by controlling the composition of the binder suspension using Expression 3, or the like, the interfacial adhesive strength between the current collector and the electrode active material layer can be improved even when the conductive material is not included in the binder suspension or is included in a trace amount. Specifically, when Expression 3 is satisfied, it is possible to is an expression to prevent the effect of improving the interfacial adhesive strength of the binder placed at the interface from being reduced by the conductive material with a large specific surface area or prevent the battery resistance increasing due to increased electrode density, the ratio of the content of the conductive material compared to the content of the binder in the binder suspension is controlled to a certain value or less, and thus, it is possible to improve the interfacial adhesive strength between the current collector and electrode active material layer while improving battery resistance.

That is, according to the above embodiment, as a binder suspension that satisfies Expression 3 while adopting the wet-on-wet method, it is possible to maintain the sufficient interfacial adhesive strength between the current collector and the electrode active material layer while also improving battery resistance.

In a specific embodiment to further improve the interfacial adhesive strength between the current collector and the electrode active material layer, the CA'/B' value of Expression 3 is 0.5 or less, 0.4 or less, or 0.3 or less, more specifically 0.2 or less or 0.1 or less, still more specifically, 0.05 or less, most specifically 0, but is not limited thereto.

When applying the binder suspension using the wet-on-wet method and then applying the electrode slurry without a separate drying process, application of electrode slurry may not be smooth due to the viscosity, surface tension, or the like of the binder suspension applied first, and in severe cases, problems such as detachment of the electrode active material layer may occur. In a specific embodiment to perform the wet-on-wet process more smoothly, based on the width direction of the electrode, optionally, a width of the binder suspension applied in the a) may be greater than a width of the electrode slurry applied in the b), but the present disclosure is not limited thereto.

In one embodiment, in the a), applying the binder suspension to at least one surface of the current collector may be performed. In one specific embodiment, the a) may be a process of uniformly applying the binder suspension to at least one surface of the current collector. In the present disclosure, uniformly applying the binder suspension means applying the binder suspension evenly on the current collector so that the binder does not form a specific pattern.

In one embodiment, the binder suspension in the a) may include a binder and a dispersion medium, and the suspension may refer to a mixture in which the binder is not dissolved and exists in the form of particles in the dispersion medium. In one specific embodiment, suspension may optionally not include a thickener and/or conductive material, or may further include a small amount. The description of the binder, thickener, and conductive material is omitted for convenience because the same description as the description of the electrode active material layer described above can be applied.

In one embodiment, the dispersion medium may be at least one selected from the group consisting of water, pure water, deionized distilled water, water, ethanol, isopropanol, methanol, acetone, n-propanol, and t-butanol, but is not limited thereto.

The content of the binder in the binder suspension is not limited thereto, but in order to further improves electrode quality problems such as pinholes and edge rises due to de-wetting during application of the binder suspension or subsequent application of electrode slurry and to apply the binder suspension in a more uniform and thin film form, the content of the binder can be appropriately adjusted considering the viscosity and solid content of the binder suspension. In one embodiment, the binder suspension includes 5 wt % or more, 10 wt % or more, 15 wt % or more, 40 wt % or less, 35 wt % or less, and 30 wt % or less of binder, or a value between the above values, based on the total weight of the binder suspension, and specifically, 5 to 40 wt %, 10 to 35 wt %, or 15 to 30 wt % but is not limited thereto.

In one embodiment, based on the total solid weight of the binder suspension, the binder suspension includes 50 wt % or more, 55 wt % or more, 60 wt % or more, 65 wt % or more, or 70 wt % or more, specifically 80 wt % or more or 90 wt % or more, more specifically, 95 wt % or more or 99 wt % or more, but is not limited thereto.

In one embodiment, the binder suspension may include an SBR-based binder, and in a specific embodiment, the binder suspension may solely include an SBR-based binder as a binder, but is not limited thereto.

The thickener increases the viscosity of the binder suspension and can further remove quality problems that may occur due to the low viscosity of the binder suspension when performing a wet-on-wet coating process, can further remove problems of cracks on the electrode surface by further strengthening the cohesion between particles at the interface between the binder suspension and the electrode slurry. In consideration of the above effects, in a specific embodiment, the binder suspension may optionally further include the thickener. In the above embodiment, the binder suspension may include the thickener of 0.1 wt % or more, 0.2 wt % or more, 0.3 wt % or more, 0.4 wt % or more, or 0.5 wt % or more, based on the total weight of the binder suspension. Moreover, in order to prevent the problem of excessive thickener causing an excessive amount of gel, resulting in an uneven coating surface and multiple pinholes, the binder suspension may include the thickener of 5 wt % or less, 4.5 wt % or less, 4 wt % or less, 3.5 wt % or less, or 3 wt % or less. Specifically, the binder suspension may include the thickener of 0.1 to 5 wt %, 0.2 to 4.5 wt %, 0.3 to 4 wt %, 0.4 to 3.5 wt %, or 0.5 to 3 wt %, based on the total weight of the binder suspension, but the present disclosure is not limited thereto.

When performing the wet-on-wet coating process in the present disclosure, an insulating layer is not formed at the interface between the electrode active material layer and the current collector. Therefore, it is possible to improve battery resistance performance and rapid charging performance without adding a conductive material to the binder suspension, secure sufficient interfacial adhesive strength between the current collector and the electrode active material layer. However, in a specific embodiment, the binder suspension may optionally further include the conductive material. When the content of the conductive material is excessive, there is a risk that some of the binders aggregate in the conductive material and increase electrode density, which may increase battery resistance and reduce the interfacial adhesive strength between the current collector and electrode active material layer. Considering the above viewpoint, in a specific embodiment, the binder suspension may include the conductive material of 5 wt % or less, 4 wt % or less, 3 wt % or less, 2 wt % or less, 1 wt % or less, 0.05 wt % or less, or 0.01 wt % or less, based on the total weight of the binder suspension, but is not limited thereto.

When the binder suspension is applied at a thickness above a certain level, it is possible to improve the interfacial adhesive strength between the current collector and the electrode active material layer. However, if the thickness of the binder suspension is too thin, a sufficient amount of binder is not secured at the interface between the current collector and the electrode active material layer, the interfacial adhesive strength is poor, detachment of the electrode layer may occur during the assembly process, and it may be difficult to apply the entire surface evenly without forming a separate pattern during application. Meanwhile, when the thickness of the binder suspension is excessive, the binder suspension may not be sufficiently mixed with the electrode slurry during the drying process, and the remaining binder suspension may form a binder insulating area at the interface between the binder suspension and the electrode slurry, which may result in poor resistance characteristics. Considering the above viewpoint, in one embodiment, the thickness of the binder suspension applied in the a) may be 0.1 µm or more, 0.2 µm or more, 0.3 µm or more, 10 µm or less, 9.5 µm or less, 9 µm or less, or a value between the above values, specifically, may be 0.1 to 10 µm, 0.2 to 9.5 µm, or 0.3 to 9 µm, but is not limited thereto.

In one embodiment, after performing the a), the b) applying the electrode slurry to the upper portion of the binder suspension may be performed. According to one embodiment, after applying the binder suspension, the electrode slurry may be applied the upper portion of the applied binder suspension. According to another embodiment, the binder suspension may be applied to the lower layer and the electrode slurry may be applied to the upper layer simultaneously, but the present disclosure is not limited thereto.

In one embodiment, the electrode slurry may include an electrode active material and, if necessary, may further include a conductive material, a binder, a thickener, or a combination thereof. The conductive material and thickener may be the same as those used in the binder suspension described above, and conductive materials and thickeners known in the art may be used without limitation.

In one embodiment, the electrode slurry may include the electrode active material of 90 wt % or more, 95 wt % or more, 97 wt % or more, 99.5 wt % or less, 99 wt % or less, or a value between the above values, based on the total solid weight of the electrode slurry, and, specifically, may include 90 to 99.5 wt %, 95 to 99.5 wt %, or 97 to 99.5 wt %, but is not limited thereto.

According to the present disclosure, even when the content of the binder in the electrode slurry is significantly reduced by first applying the binder suspension to the current collector and then applying and drying the electrode slurry to the upper portion of the binder suspension, during drying the binder suspension, the migration and diffusion of binder particles can secure the interfacial adhesive strength between the current collector and the electrode active material layer, and the rapid charging performance of the battery can be improved by lowering the resistance of the electrode surface. In a specific embodiment, optionally, the electrode slurry may include 2 wt % or less, 1.5 wt % or less, or 1 wt % or less of a binder, based on the total solid weight of the electrode slurry, and in a more specific embodiment, the electrode slurry may not include the binder in order to improve rapid charging performance of the battery, but the present disclosure is not limited thereto.

In a specific embodiment, optionally, the electrode slurry may include the thickener of 5 wt % or less, 3 wt % or less, or 2 wt % or less based on the total solid weight of the electrode slurry, but the present disclosure is not limited thereto.

In one embodiment, the thickness of the electrode slurry applied in the b) may be 50 µm or more, 100 µm or more, 150 µm or more, 500 µm or less, or a value between the above values, and specifically, may be 50 to 500 µm or 100 to 500 µm, but the present disclosure is not limited thereto.

In one embodiment, the electrode slurry may be prepared by utilizing, without limitation, any method known to be used for forming the electrode slurry for the secondary battery known in the art.

In one embodiment, the application of the binder suspension in the a) and the application of the electrode slurry in the b) may apply, without limitation, application methods known in the art. Non-limiting examples of the application methods include spray coating, dip coating, spin coating, gravure coating, slot die coating, doctor blade coating, roll coating, inkjet printing, flexography printing, screen printing, electrostatic hydrodynamic printing, micro contact printing, imprinting, reverse offset printing, bar-coating, gravure offset printing, multi-layer simultaneous die coating, or the like, but the present disclosure is not limited thereto.

In one specific embodiment, the binder suspension and electrode slurry can be applied simultaneously using a multi-layer simultaneous die coating method. In a more specific embodiment, in order to further improve the uniformity or quality of the electrode surface, the binder suspension and electrode slurry may be applied sequentially.

In one embodiment, after performing the b), c) simultaneously drying the binder suspension applied in the a) and the electrode slurry applied in the b) may be performed.

When simultaneously drying the binder suspension and the electrode slurry applied in the wet-on-wet method as in the above embodiment, the binder particles in the binder suspension diffuse to the electrode active material layer and are continuously and densely distributed in a certain area from the interface between the current collector and the electrode active material layer to the electrode active material layer. Accordingly, it is possible to reduce the problem of increased interfacial resistivity value and decreased adhesive strength between the current collector and the electrode active material layer, which are problems that occur when applying a conventional binder solution.

In one embodiment, a drying time may be 10 seconds or more, 20 seconds or more, 30 seconds or more, 40 seconds or more, 50 seconds or more, 60 seconds or more, 70 seconds or more, 80 seconds or more, 90 seconds or more, 300 seconds or less, 280 seconds or less, 260 seconds or less, 240 seconds or less, 220 seconds or less, 200 seconds or less, 180 seconds or less, 160 seconds or less, 150 seconds or less, 140 seconds or less, 130 seconds or less, 120 seconds or less, 110 seconds or less, or a value between the above values, and specifically, may be 10 to 300 seconds, 20 to 240 seconds, or 30 to 180 seconds, but the present disclosure is not limited thereto.

In one embodiment, a drying temperature may be 50° C. or more, 60° C. or more, 70° C. or more, 80° C. or more, 90° C. or more, 300° C. or less, 280° C. or less, 260° C. or less, 240° C. or less, 220° C. or less, 200° C. or less, or a valve between the above values, and specifically, may be 50 to 300° C. or 100 to 200° ° C., but the present disclosure is not limited thereto.

According to one embodiment, the electrode in which the electrode active material layer is formed on the current collector can be manufactured by rolling the electrode in which drying of the c) has been completed to an appropriate density. In this case, all rolling conditions and rolling methods known in the relevant technical field may be applied to the rolling, and there is no limitation.

In one embodiment, there is provided a secondary battery including the electrode of the above embodiment, a separation membrane, and an electrolyte. The electrode is the same as described above.

The separation membrane can be used without limitation as long as it is a separation membrane known in the relevant technical field. A non-limiting example of the separation membrane may be a separation membrane made of a material selected from glass fiber, polyester, polyethylene, polypropylene, polytetrafluoroethylene, or a combination thereof, may be in the form of a non-woven or woven fabric, and may be a single-layer structure or a multi-layer structure.

In one embodiment, the electrolyte includes a non-aqueous organic solvent and an electrolytic salt. Non-limiting examples of the non-aqueous organic solvent include ethylene carbonate (EC), propylene carbonate (PC), dimethyl carbonate (DMC), diethyl carbonate (DEC), ethylmethyl carbonate (EMC), 1,2-dimethoxyethane (DME), g-butyrolactone (BL), tetrahydrofuran (THF), 1,3-dioxolane (DOL), diethyl ether (DEE), methyl formate (MF), methyl propionate (MP), sulfolane (S), dimethyl sulfoxide (DMSO), acetonitrile (AN), or mixtures thereof, but the present disclosure is not limited thereto. The electrolytic salt is a substance that is dissolved in the non-aqueous organic solvent and acts as a source of electrolytic metal ions within the battery, enabling the basic operation of the secondary battery and promoting the movement of electrolytic metal ions between the positive electrode and the negative electrode. When the electrolytic metal is lithium, non-limiting examples of the electrolytic salt include $LiPF_6$, $LiBF_4$, LiTFSI, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, LiI, or a mixture thereof, but the present disclosure is not limited thereto. In addition, the electrolytic salt may use known materials at a concentration suitable for the purpose, and may further include known solvents or additives to improve charge/discharge characteristics, flame retardancy characteristics, or the like, if necessary.

In the method of manufacturing a lithium secondary battery according to the present disclosure to achieve the above purpose, the battery is manufactured by forming an electrode assembly with the manufactured electrode and the separation membrane, inputting the manufactured electrode assembly in a cylindrical battery case or a prismatic battery case, and then injecting the electrolyte, or the battery is manufactured by impregnating the electrode assembly with the electrolyte and sealing the resulting product in the battery case.

In one embodiment, any battery case known in the relevant technical field may be adopted as the battery case without limitation. As a non-limiting example, the battery case may be cylindrical, prismatic, pouch-shaped, or coin-shaped, but the present disclosure is not limited thereto.

The lithium secondary battery according to the present embodiment can not only be used in a battery cell used as a power source for small devices, but can also be preferably used as a unit cell in a medium-to-large sized battery module containing a plurality of battery cells. Preferred examples of the medium-to-large devices include electric vehicles, hybrid electric vehicles, plug-in hybrid electric vehicles, power storage systems, or the like, but the present disclosure are not limited to these.

Hereinafter, embodiments of the present disclosure will be further described with reference to specific experimental examples. The examples and comparative examples included in the experimental examples only illustrate the present disclosure and do not limit the scope of the appended claims, and it is obvious to those skilled in the art that various changes and modifications to the embodiments are possible within the scope and spirit of the present disclosure, and it is natural that such changes and modifications fall within the scope of the appended patent claims. The measurement/evaluation method of the physical properties of the present disclosure can be accomplished by the following methods.

1. Interfacial Adhesive Strength

An electrode is cut into 18 mm wide×150 mm long to make a sample, and adhesive strength between the current collector and the electrode active material layer of the manufactured sample is measured an adhesive strength measuring device (DS2-50N from IMADA). In the measurement method, a double-sided tape is attached to an adhesive strength measurement jig, the current collector surface of the electrode is placed on the tape, the current collector surface is attached by reciprocating a roller with a 2 kg load 10 times, the tape is cut to 18 mm wide, the tape is attached to the center of the measurement jig with the tape surface facing down, and the interfacial adhesive strength of the electrode active material layer is measured by moving the adhesive strength measuring device in a 90-degree vertical direction of the adhesive surface at a speed of 300 rpm. The result of dividing the measured strength by the width of the tape is expressed in units of interfacial adhesive strength.

2. CA'/B'

When manufacturing the electrode, CA'/B' is derived as a ratio of CA', which is the wt % of the conductive material in the binder suspension, compared to B', which is the wt % of the binder in the binder suspension, based on the total weight of the binder suspension.

3. CA/B

Based on the total weight of the binder layer protruding from the end of the electrode active material layer, CA/B is derived as a ratio of CA, which is the wt % of the conductive material in the binder layer, compared to B, which is wt % of the binder in the binder layer.

4. B*t*Bd/Lw

B*t*Bd/Lw is derived by substituting the numerical values of B, t, Bd, and Lw below.

B: wt % of binder in binder layer based on the total weight of binder layer
 t: thickness of binder layer (μm)
 Bd: binder density within binder layer (g/cm$^3$)
 Lw: cross-sectional application amount of electrode active material layer (mg/cm$^2$)

5. Electrode Porosity

The pore characteristics of electrodes are measured by ASTM D4284-07. Specifically, samples are prepared by cutting all electrodes with the electrode active material layer formed on the current collector to a weight of 0.2 to 0.4 g, and pretreated under vacuum at 120° C. for 12 hours to remove moisture. Thereafter, the porosity and mean pore size are measured using Autopore V measuring device of Micrometrics according to the mercury porosity measurement method according to ASTM D4284-07.

6. Discharge Resistance (DC-IR)

The secondary battery is charged (0.3 C CC/CV charging 4.2V 0.05 C cut) at a temperature of 25° C., rested for 10 minutes, and discharged (0.3 C CC discharge SOC50 cut). The battery is rested for 1 hour at SOC50 (state of charge 50%), discharged at 1 C for 10 seconds, and rested for another 10 seconds. In this case, a difference between a voltage after resting for 1 hour at SOC50 and a voltage after 1 C discharge for 10 seconds is divided by the current value of 1 C to calculate the discharge resistance (DC-IR) at SOC50.

7. dV/dQ

After discharging the secondary battery (0.30 CC discharge 2.8 V), the secondary battery is charged with CC up to 4.2 V with a current of 1.5 C or 2.0 C. In this case, when the measured charging data is converted to dV/dQ, respectively, and a graph is drawn, the SOC level at an inflection point during charging is checked and obtained. A more dV/dQ value means better fast charging performance.

EXAMPLE

Example 1

Preparation of Negative Electrode

Based on the total weight of the binder suspension, 15 wt % of SBR-based binder (BM451B from Zeon) was dispersed in water to prepare a binder suspension.

A negative electrode active material mixed with artificial graphite (D50:13 μm) and natural graphite (D50:10 μm) at a weight ratio of 1:1, SBR binder (BM451B from Zeon), and CMC thickener (D2200 from Daicel) were added to water at a weight ratio of 98.5:0.5:1 to prepare a negative electrode slurry with a viscosity of 5,000 cps.

The binder suspension prepared on one surface of a copper current collector (copper foil of 8 μm thick) was applied using a gravure coater, and the prepared negative electrode slurry was applied on the wet binder suspension using a slot die. In this case, based on the width direction of the electrode, the applied binder suspension was applied so that the width was larger than the width of the subsequently applied electrode slurry.

Figure 2:
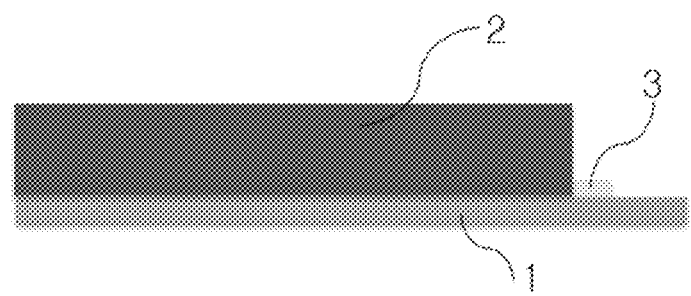
FIG. 2 is a cross-section in the z-axis direction of the negative electrode of Example 1.

Thereafter, the wet binder suspension and electrode slurry were simultaneously dried at 120 to 170° C. for 1 minute, and a negative electrode formed with a negative electrode active material layer and the binder layer protruding from at least one end of the negative electrode active material layer was prepared on the current collector. Based on the dried negative electrode, a thickness of the negative electrode active material layer was 200 μm, and the thickness of the binder layer was 1 μm. Referring to the attached FIGS. 1 and 2, the current collector 1, the electrode active material layer 2 located on the current collector 1, and the binder layer 3 protruding from the ends in the width direction (x-axis direction) of the electrode active material layer could be confirmed.

In this case, the composition of the negative electrode active material layer of the manufactured negative electrode was 97.5 wt % of the negative electrode active material, 1.5 wt % of the SBR binder, and 1 wt % of the CMC thickener based on the total weight of the negative electrode active material layer. The dried electrode was rolled to an electrode density of 1.75 g/cm$^3$ to manufacture the negative electrode having a copper foil thickness of 8 μm and a negative electrode active material layer thickness of 122 μm.

Example 2

A negative electrode was manufactured under the same conditions as in Example 1, except that the binder layer was applied and dried to a thickness of 0.5 μm.

Example 3

A negative electrode for a secondary battery was manufactured under the same conditions as in Example 1, except that the binder layer was applied and dried to a thickness of 2 μm.

Example 4

Based on the total weight of the binder suspension, the SBR binder (BM451B from Zeon) of 11.7 wt %, the CMC thickener (D2200 from Daicel) of 0.3 wt % of, and carbon black conductive material (Super-C65 from Imerys) of 3.0 wt % were dispersed in water to prepare the binder suspension.

The negative electrode slurry was prepared under the same conditions as in Example 1.

A negative electrode for a secondary battery was manufactured under the same conditions as in Example 1, except that the binder layer was applied and dried to be a thickness of 1.2 μm, and rolled to an electrode density of 1.76 g/cm$^3$ after drying.

Comparative Example 1

Comparative Example 1 was prepared by applying a first negative electrode slurry to a negative electrode with a dual layer structure, and then applying a second negative electrode slurry to the first negative electrode slurry. The first negative electrode slurry is prepared by adding the negative electrode active material mixed with artificial graphite and natural graphite used in Example 1 at a weight ratio of 1:1, the SBR-based binder (BM451B from Zeon), and the CMC thickener (D2200 from Daicel) to water at a weight ratio of 97:2:1.

The second negative electrode slurry is prepared by adding the negative electrode active material mixed with artificial graphite and natural graphite used in Example 1 at a weight ratio of 1:1, the SBR binder (BM451B from Zeon), and the CMC thickener (D2200 from Daicel) to water at a weight ratio of 98:1:1.

A negative electrode active material layer having a thickness of 200 μm was prepared by applying the first negative electrode slurry and the second negative electrode slurry prepared to one surface of a copper current collector (8 μm thick copper foil) at a thickness ratio of 1:1 by a multi-layer simultaneous die coating method using a slot die, and then performing drying at 120 to 170° C. for one minute. After drying, a negative electrode in which the first negative electrode active material layer and the second negative electrode active material layer were sequentially formed on the current collector was manufactured by performing rolling at an electrode density of 1.75 g/cm³.

Comparative Example 2

A binder suspension was prepared by dispersing 8.4 wt % of the SBR-based binder (BM451B from Zeon), 0.6 wt % of the CMC thickener (D2200 from Daicel), and 6.0 wt % of the carbon black conductive material (Super-C65 from Imerys) in water, based on the total weight of the binder suspension.

The negative electrode slurry was prepared under the same conditions as in Example 1.

The binder suspension prepared on one surface of a copper current collector (copper foil of 8 μm thick) was applied using a gravure coater, the prepared negative electrode slurry was applied on the wet binder suspension using a slot die and then dried to 120 to 170° C. for one minute, and thus, a negative electrode active material layer with a thickness of 202 μm and a binder layer with a thickness of 3 μm were manufactured. The dried electrode was rolled to an electrode density of 1.79 g/cm³ to manufacture a negative electrode with the negative electrode active material layer formed on the current collector. In this case, the thickness of the manufactured negative electrode active material layer was 122 μm, which was the same as Example 1.

Comparative Example 3

A negative electrode was manufactured under the same conditions as Comparative Example 2, except that the binder layer was applied and dried to a thickness of 1 μm.

Comparative Example 4

A negative electrode was manufactured under the same conditions as Comparative Example 3 except that the binder suspension was prepared by dispersing 3.6 wt % of the SBR binder (BM451B from Zeon), 0.4 wt % of the CMC thickener (D2200 from Daicel), and 11.0 wt % of the carbon black conductive material (Super-C65 from Imerys) in water, based on the total weight of the binder suspension.

[Evaluation Example 1] Interfacial Adhesive Strength Evaluation

TABLE 1

| Unit | Binder suspension | | | | CA'/ B' | Binder layer thickness μm | Interfacial adhesive strength N/cm | CA/ B | B*t*Bd/ Lw % |
|---|---|---|---|---|---|---|---|---|---|
| | SBR Wt % | CMC Wt % | Carbon black Wt % | SBR in solid content Wt % | | | | | |
| Example 1 | 15 | — | — | 100 | 0.00 | 1 | 0.14 | 0.00 | 1.0 |
| Example 2 | 15 | — | — | 100 | 0.00 | 0.5 | 0.12 | 0.00 | 0.5 |
| Example 3 | 15 | — | — | 100 | 0.00 | 2 | 0.16 | 0.00 | 2.0 |
| Example 4 | 11.7 | 0.3 | 3.0 | 78 | 0.26 | 1.2 | 0.12 | 0.25 | 0.9 |
| Comparative Example 1 | Ref. dual layer | | | | | — | 0.12 | — | — |
| Comparative Example 2 | 8.4 | 0.6 | 6.0 | 56 | 0.71 | 3 | 0.13 | 0.71 | 1.6 |
| Comparative Example 3 | 8.4 | 0.6 | 6.0 | 56 | 0.71 | 1 | 0.08 | 0.72 | 0.6 |
| Comparative Example 4 | 3.6 | 0.4 | 11.0 | 24 | 3.06 | 1 | 0.08 | 3.06 | 0.2 |

Referring to the results in Table 1, in Examples 1 to 4, which satisfied the binder suspension composition limited in the present embodiment and applied the binder suspension and electrode slurry using the wet-on-wet method, interfacial adhesive strength and pore characteristics of the electrode were excellent, sufficient ionic conductivity was secured, and high-speed charging performance was also excellent.

In Comparative Example 1 which had the electrode with a dual layer structure, the interfacial adhesive strength was good because the slurry with a high binder content was applied to the lower layer slurry, but, in the subsequently estimated binder distribution analysis, the binder content of the surface portion of the electrode active material layer was measured to be higher than that of Example 1, and as a result, the battery resistance and high-speed charging performance were inferior.

Comparative Example 2 did not satisfy the CA'/B' range and CA/B range of the present embodiment because the content of conductive material was too high compared to the binder content in the binder suspension. In Comparative Example 2, even when the interfacial adhesive strength was secured at a certain level by forming a thick binder layer, as the electrode density increased, finer pore characteristics were identified in subsequent evaluations, which resulted in inferior battery resistance and high-speed charging performance.

In Comparative Example 3, the binder layer was formed to a thin thickness like Example 1, but the content of the conductive material was too high compared to the binder content in the binder suspension, the CA'/B' range and CA/B range of the present embodiment were not satisfied. Moreover, even when a certain amount of binder was distributed at the interface, the binder content adsorbed to the conductive material was high, and thus, sufficient interfacial adhesive strength could not be secured. As a result, the quality of the electrode was very poor due to scratches and detachment of the electrode active material layer during electrode rolling.

Comparative Example 4 did not satisfy the CA'/B' range and the CA/B range of the present embodiment since the conductive material content was too high compared to the binder content in the binder suspension, and in Comparative Example 4, the binder layer thickness was also thin. As a result, sufficient interfacial adhesive strength was not secured, and as in Comparative Example 3, the quality of the electrode was very poor due to scratches and detachment of the electrode active material layer during rolling.

Figure 3:
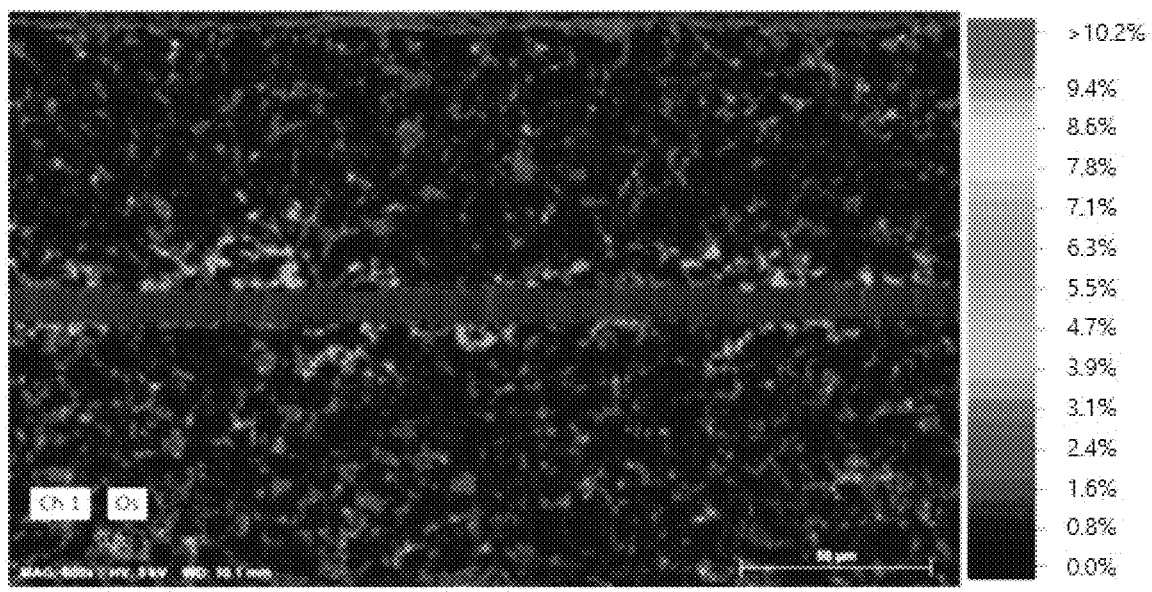
FIG. 3 is a cross-sectional EDS mapping color image in a thickness direction of the negative electrode in Example 1. The color drawing is necessary to clearly show the EDS mapping color image.
Figure 5:
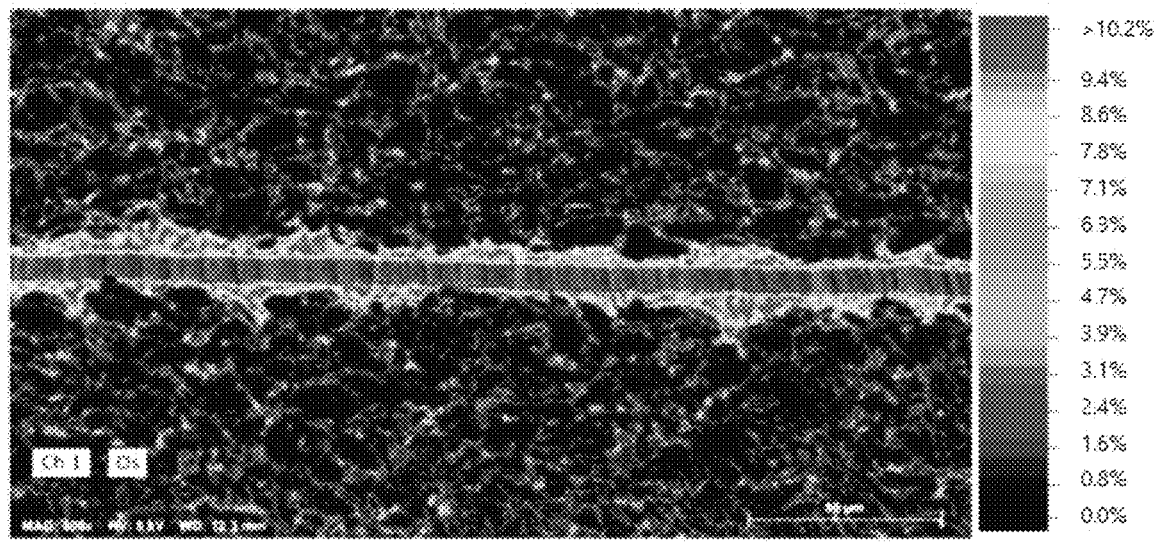
FIG. 5 is a cross-sectional EDS mapping color image in a thickness direction of a negative electrode of Comparative Example 2. The color drawing is necessary to clearly show the EDS mapping color image.

[Evaluation Example 2] Binder Distribution Evaluation in Electrode Thickness Direction The results of double-sided energy-dispersive spectroscopy (EDS) mapping images in the thickness direction of the electrodes manufactured in Example 1 and Comparative Examples 1 and 2 are illustrated in FIGS. 3 and 5, respectively. In this case, in order to determine the distributions of the conductive material and the binder, Os gas was sufficiently exposed to the electrode and the EDS mapping image was obtained for the Os element.

Referring FIG. 3, in the electrode manufactured in Example 1, a separate binder layer was not formed, the binder content was high near the interface between the current collector and the electrode active material layer, and a continuous binder distribution with the binder content decreasing as the distance from the interface increased was observed. This is analyzed to be because the binder particles were well mixed with the electrode active material layer. By using the binder suspension according to the present embodiment, it was confirmed that the contact between the current collector and the active material layer was continuously and very closely formed as the binder particles diffused into the electrode slurry layer when the electrode was dried, even when the binder suspension was applied in a thin thickness. From this, it was confirmed that it was possible to manufacture the electrode in which the interfacial resistivity value did not increase even though the binder suspension, which was the insulator, was uniformly applied in the width direction without applying conventional pattern coating.

Figure 4:
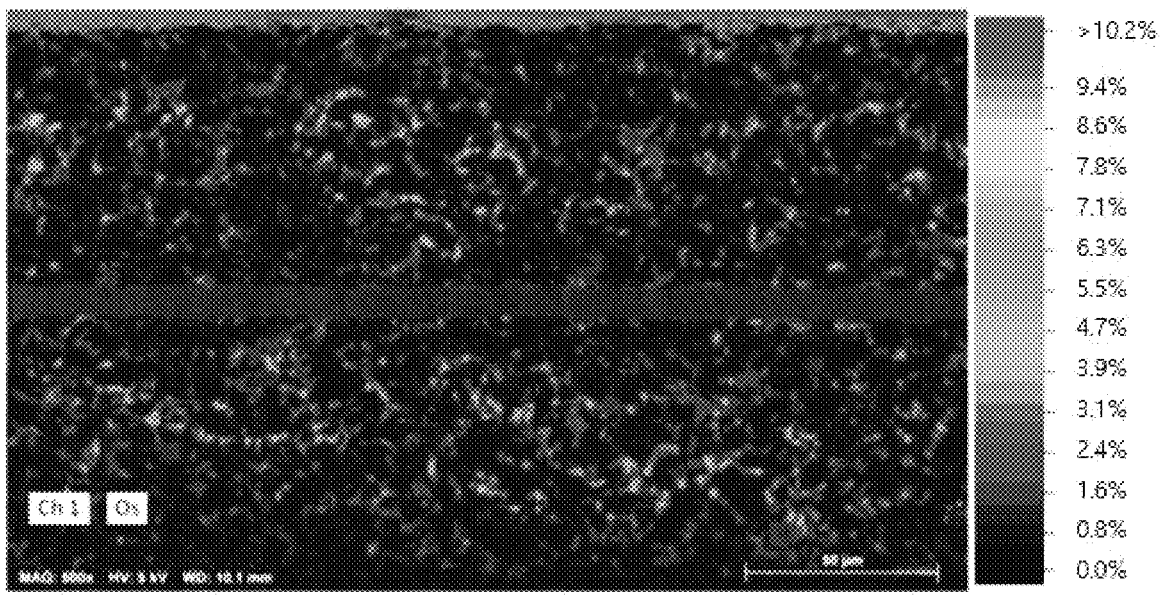
FIG. 4 is a cross-sectional EDS mapping color image in a thickness direction of a negative electrode of Comparative Example 1. The color drawing is necessary to clearly show the EDS mapping color image.

Meanwhile, in Comparative Example 1, referring to FIG. 4, since the double-layer negative electrode slurry was applied and dried using a multi-layer simultaneous die method, the binder content in the middle and surface of the electrode was confirmed to be more than that of Example 1, and thus, it could be inferred that the battery resistance and rapid charging performance were inferior compared to Example 1.

In Comparative Example 2, referring to FIG. 5, it was confirmed that the conductive material with a large amount of binder adsorbed due to the excessive conductive material content was densely distributed at the upper portion of the current collector, and it was clearly confirmed that the binder adsorbed on the conductive material was dense between the electrode active material layer and the current collector, occupying a portion of the total thickness of the electrode. That is, it was found that when the electrode of Comparative Example 2 was rolled to the same thickness as Example 1 and Comparative Example 1, the density of the active material layer could be increased, which resulted in poor fast charging performance.

[Evaluation Example 3] Evaluation of Electrode Pore Characteristics

TABLE 2

|  | Electrode density (g/cm$^3$) | Porosity (%) | Mean pore size (μm) |
|---|---|---|---|
| Example 1 | 1.75 | 17.4 | 0.810 |
| Comparative Example 1 | 1.75 | 18 | 0.878 |
| Comparative Example 2 | 1.79 | 11.1 | 0.724 |

Figure 6:
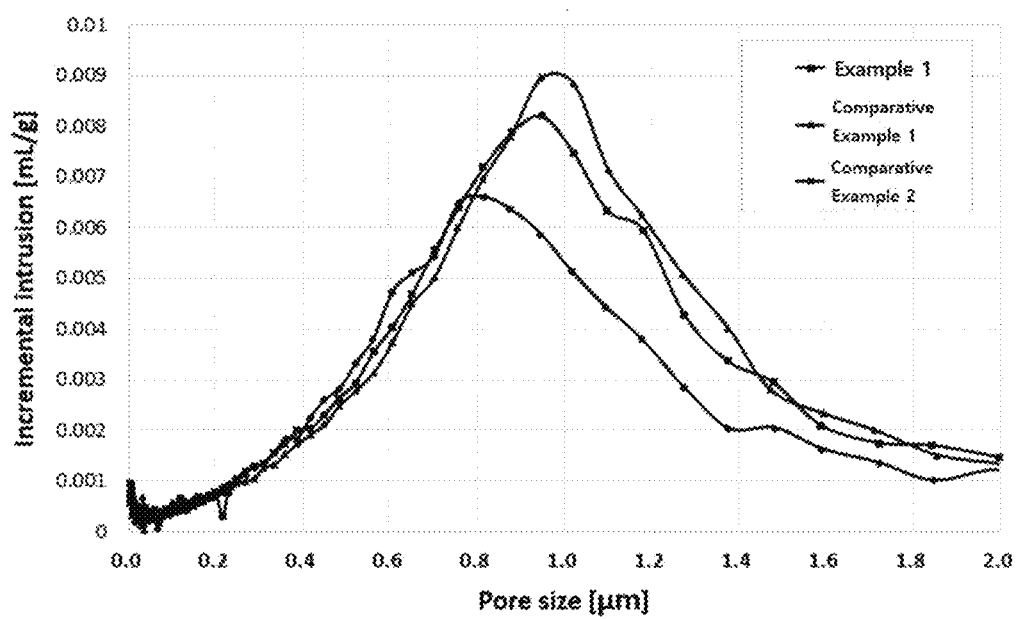
FIG. 6 is a graph illustrating pore characteristics of the negative electrodes manufactured by Example 1 and Comparative Examples 1 and 2.

Referring to the results in Table 2 and the results in FIG. 6, it was confirmed that Example 1 and Comparative Example 1 had similar levels of porosity and mean pore size, but in Comparative Example 2, the porosity was low and the mean pore size was measured to be small. From this, it was confirmed that when the conductive material having a high content was included in the binder suspension to secure conductivity, the conductive material aggregates with the binder, increasing electrode density and deteriorating electrolyte impregnation characteristics and battery resistance characteristics.

[Evaluation Example 4] Rapid Charging Performance Evaluation

In order to evaluate the rapid charging performance, a battery was constructed using the negative electrodes of Example 1 and Comparative Examples 1 and 2 under the following conditions.

<Secondary Battery Manufacturing>

The negative electrode and positive electrode prepared in Example 1 and Comparative Examples 1 to 2 were notched to a predetermined size and laminated, respectively, a separator (polyethylene, thickness 13 μm) was interposed between the positive electrode and the negative electrode to form an electrode cell, and then, the tab portions of the positive electrode and negative electrode were welded, respectively. The welded positive electrode/separator/negative electrode assembly was placed in a pouch and all three sides except the electrolyte injection surface were sealed. In this case, the part with the electrode tab was included in the sealing portion. Electrolyte was injected through the remaining surfaces excluding the sealing portion, and the remaining surfaces were sealed and impregnated for more than 12 hours. The electrolyte obtained by dissolving 1M LiPF$_6$ in a mixed solvent of EC/EMC/DEC (25/45/30; volume ratio) and adding 1 wt % of vinylene carbonate (VC), 0.5 wt % of 1,3-propenesultone (PRS), and 0.5 wt % of Lithium bis (oxalato)borate (LiBOB) was used. The positive electrode slurry was prepared by mixing Li[Ni$_{0.88}$Co$_{0.1}$Mn$_{0.02}$]O$_2$ as the positive electrode active material, the carbon black as the conductive material, and polyvinylidene fluoride (PVdF) as the binder at a weight ratio of 96.5:2:1.5, and the positive electrode was prepared by uniformly applying the positive electrode slurry to a 12 μm thick aluminum foil and vacuum-drying.

Thereafter, pre-charging was performed for 36 minutes with a current equivalent to 0.25 C. After 1 hour, degassing was performed, aging was performed 24 hours or more, and thereafter, chemical charging and discharging was performed (charge conditions CC-CV 0.2 C 4.2V 0.05 C CUT-OFF, discharge conditions CC 0.2 C 2.5V CUTOFF). After that, standard charging and discharging was performed (charging conditions CC-CV 0.33 C 4.2V 0.05 C CUT-OFF, discharging conditions CC 0.33 C 2.5V CUT-OFF).

TABLE 3

|  | Discharge resistance (m · ohm) | dV/dQ on-set (1.5 C) (%) | dV/dQ on-set (2 C) (%) |
|---|---|---|---|
| Example 1 | 1.27 | 77.90 | 69.20 |
| Comparative Example 1 | 1.35 | 68.30 | 55.70 |
| Comparative Example 2 | 1.34 | 67.50 | 54.60 |

The secondary battery manufactured with the negative electrode of Example 1 had lower discharge resistance (DC-IR) and superior rapid-charging characteristics than the secondary battery manufactured with the negative electrode of Comparative Example 1 manufactured by double-layer simultaneous coating without using a binder suspension. That is, even though the binder suspension layer does not include the conductive material, the electrode slurry is applied on the binder suspension using the wet-on-wet method, so that the binder particles are sufficiently diffused into the electrode slurry to sufficiently form a conductive pass at the interface between the current collector and the electrode active material layer, and ideal binder distribution within the electrode can be secured, which means that battery resistance can be lowered.

Meanwhile, when the binder suspension mixed with a large amount of conductive material is used to secure conductivity at the interface as in Comparative Example 2 and the binder suspension is applied thickly to 3 μm to secure the adhesive strength, it is confirmed that the electrode density increases due to the conductive material present at the interface, and the porosity and pore size of the electrode decrease, which worsens the ionic conductivity of the electrode and deteriorates the rapid-charging characteristics.

According to the electrode for a secondary battery of the present disclosure, it is possible to improve the interfacial adhesive strength between the current collector and the electrode active material layer, reduce process defects such as detachment of the electrode, and improve rapid charging performance.

In addition, the present disclosure can provide a binder suspension composition suitable for a wet-on-wet method to improve battery resistance while improving the interfacial adhesive strength between the current collector and the electrode active material layer, and an electrode manufactured from the binder suspension composition.

In addition, the present disclosure provides a binder suspension composition suitable for the wet-on-wet method that does not deteriorate pore characteristics of the electrode and an electrode manufactured from the binder suspension composition.

The content described above is merely an example of applying the principle of the present disclosure, and other configurations may be further included without departing from the scope of the present disclosure.

What is claimed is:

1. An electrode for a secondary battery, the electrode comprising:
    a current collector;
    an electrode active material layer located on at least one surface of the current collector; and
    a step-shape stage comprising a binder layer, contacting the at least one surface of the current collector, protruding from at least one end of the electrode active material layer, and having a predetermined area and thickness protruding in a width direction,
    wherein the thickness of the stage is 0.1 μm to 3 μm, wherein the thickness is the vertical length from an interface between the current collector and the electrode active material layer,
    wherein the binder layer satisfies the following Expression 1

$$CA/B \leq 0.6$$ [Expression 1]

wherein CA is wt % of a conductive material in the binder layer, and B is wt % of a binder in the binder layer, based on a total weight of the binder layer.

2. The electrode of claim 1, wherein the following Expression 2 is satisfied $$0.3 < B*t*Bd/Lw < 1.5$$ [Expression 2]

wherein B is wt % of the binder in the binder layer based on a total weight of the binder layer, t is a thickness of the binder layer (μm), Bd is a density of the binder in the binder layer (g/cm$^3$), and Lw is an amount of electrode slurry applied per unit area the electrode active material layer (g/cm$^2$).

3. The electrode of claim 1, wherein a ratio of a thickness of the binder layer to a thickness of the electrode active material layer is 0.1 or less.

4. The electrode of claim 1, wherein the electrode active material layer comprises an SBR-based binder.

5. The electrode of claim 1, wherein the electrode active material layer comprises 3 wt % or less of binder based on a total weight of the electrode active material layer.

6. The electrode of claim 5, wherein the electrode active material layer further comprises a conductive material of 5 wt % or less based on a total weight of the electrode active material layer.

7. The electrode of claim 1, wherein porosity of the electrode is 12% or more.

8. The electrode of claim 1, wherein a mean pore size of the electrode is 0.75 μm or more.

9. A method of manufacturing an electrode for a secondary battery, the method comprising:
    a) applying a binder suspension to at least one surface of a current collector;
    b) applying electrode slurry to an upper portion of the binder suspension, wherein a width of the binder suspension applied in a) is greater than a width of the electrode slurry applied in b) based on a width direction of the electrode; and
    c) simultaneously drying the binder suspension applied in the a) and the electrode slurry applied in the b),
    through the process c), an electrode active material layer is formed on the at least one surface of the current collector, and a step-shape stage comprising a binder layer is formed from at least one end of the electrode active material layer, and is in contact with the at least one surface of the current collector, the stage has a predetermined area and thickness protruding in a width direction, wherein the binder suspension in the a) satisfies the following Expression 3

$$CA'/B' \leq 0.6 \qquad \text{[Expression 3]}$$

wherein CA' is wt % of a conductive material in the binder suspension, and B' is wt % of a binder in the binder suspension, based on a total weight of the binder suspension.

10. The method of claim 9, wherein the binder suspension in the a) comprises 5 to 40 wt % of the binder based on the total weight of the binder suspension.

11. The method of claim 10, wherein the binder suspension in the a) further comprises 5 wt % or less of the conductive material based on the total weight of the binder suspension.

12. The method of claim 9, wherein the binder suspension in the a) comprises 50 wt % or more of the binder based on a total solid weight of the binder suspension.

13. The method of claim 9, wherein the binder suspension in the a) comprises an SBR-based binder.

14. The method of claim 9, wherein a thickness of the binder suspension applied in the a) is 10 μm or less.

15. The method of claim 9, wherein in the a), the binder suspension is uniformly applied to the at least one surface of the current collector.

16. The method of claim 9, wherein the electrode slurry in the b) comprises 2 wt % or less of a binder based on a total solid weight of the electrode slurry.

17. The method of claim 9, wherein the c) is performed at a temperature of 50 to 300° C. for 10 to 300 seconds.

18. A secondary battery comprising:
the electrode of claim 1;
a separation membrane; and
an electrolyte.

* * * * *